United States Patent [19]

Gerard et al.

[11] 4,409,304
[45] Oct. 11, 1983

[54] ELECTROCHEMICAL DEVICE COMPRISING AT LEAST TWO CELLS CONNECTED IN ELECTRICAL SERIES

[75] Inventors: Francois Gerard; Jean-Yves Machat, both of Clermont-Ferrand, France

[73] Assignee: Compagnie Generale des Etablissements Michelin, Clermont-Ferrand, France

[21] Appl. No.: 352,368

[22] Filed: Feb. 25, 1982

[30] Foreign Application Priority Data

Feb. 27, 1981 [FR] France .................. 81 04155

[51] Int. Cl.$^3$ ............................. H01M 2/24
[52] U.S. Cl. .................. 429/158; 429/136; 429/160; 429/178
[58] Field of Search .............. 429/160, 158, 161, 178, 429/136

[56] References Cited

U.S. PATENT DOCUMENTS

| | | | |
|---|---|---|---|
| 4,022,951 | 5/1977 | McDowall | 429/149 |
| 4,267,243 | 5/1981 | Park et al. | 429/136 |
| 4,292,381 | 9/1981 | Klein | 429/178 X |

FOREIGN PATENT DOCUMENTS

| | | |
|---|---|---|
| 191304 | 10/1907 | Fed. Rep. of Germany . |
| 730503 | 1/1943 | Fed. Rep. of Germany . |
| 2726562 | 12/1978 | Fed. Rep. of Germany . |
| 2347218 | 4/1979 | Fed. Rep. of Germany . |
| 2744775 | 4/1979 | Fed. Rep. of Germany . |
| 2921687 | 12/1979 | Fed. Rep. of Germany . |
| 655628 | 4/1929 | France . |
| 7821501 | 2/1980 | France . |
| 206094 | 11/1923 | United Kingdom . |

*Primary Examiner*—Charles F. LeFevour
*Attorney, Agent, or Firm*—Brumbaugh, Graves, Donohue & Raymond

[57] ABSTRACT

An electrochemical device comprising at least two cells with electrodes in the form of plates is characterized by the following features:
(a) each plate is joined on at least one side to a current outlet which in turn is joined to an electron-conductive extension;
(b) the extension abuts at a terminal or, at least in part, constitutes a terminal;
(c) the electrical junction between each plate and its outlet is effected substantially over the entire corresponding side of the plate;
(d) each outlet and the corresponding extension form an assembly; the distance between the extreme edges of this assembly is substantially equal to the length of the corresponding side of said plate, these extreme edges abutting at said plate;
(e) the two cells are connected in electrical series by at least two terminals; the electrical junction between these two terminals is effected substantially over said entire distance between extreme edges in the case of each extension which abuts at one of these terminals or which, at least in part, constitutes one of these terminals.

17 Claims, 9 Drawing Figures

ELECTROCHEMICAL DEVICE COMPRISING AT LEAST TWO CELLS CONNECTED IN ELECTRICAL SERIES

The present invention concerns electrochemical devices. The expression "electrochemical device" is to be understood in a very broad sense and concerns both electrochemical devices which produce electrical current, such as primary cells or rechargeable batteries, and devices which consume electrical current, for instance in order to produce chemical elements or compounds by electrolysis.

The invention more particularly concerns electrochemical devices comprising at least two cells, each cell comprising positive and negative electrode plates, the cells being electrically connected.

The French Patent Application published under U.S. Pat. No. 2,431,772 describes electrodes having bars arranged in fan-shape in order to try to distribute the current over the entire surface of the electrodes.

West German Patent Applications Published under Nos. 2,726,562 and 2,744,775 describe plates of active material which are electrically connected in pairs by a common collector which is in the form of a metal sheet.

West German Pat. No. 730,503 describes a battery electrode having a frame of plastic material defining columns of window openings within which the active material is located. The windows in each column are connected electrically by a common collector which is in the form of a rod which passes through the frame.

The West German Patent Applications published under Nos. 2,347,218 and 2,921,687 describe multiple-cell batteries with molded frames, the collectors of the electrodes protruding on the sides for the electrical contacts.

The electrochemical devices described in the above documents are characterized by heterogeneous operation of the electrodes or by a substantial electric loss by Joule effect when they comprise several cells.

The purpose of the invention is to eliminate these drawbacks.

Accordingly, the electrochemical device in accordance with the invention comprising at least two cells, each cell comprising at least one positive electrode and at least one negative electrode in the form of plates, is characterized by the following features:
  (a) each plate is joined on at least one side to a current outlet which in turn is joined to an electron-conductive extension;
  (b) the extension corresponding to each plate abuts at its so-called "free" end at a terminal, called the "cell terminal", of the same polarity as the plate, or, at least in part, constitutes such a terminal at its "free" end, each cell thus having at least one positive terminal and at least one negative terminal;
  (c) the electrical junction between each plate and its outlet is effected substantially over the entire corresponding side of the plate;
  (d) each outlet and the corresponding extension form an assembly located outside the plate; the distance between the extreme edges of this assembly is substantially equal to the length of the corresponding side of said plate, from said plate up to the "free" end of the corresponding extension, these extreme edges abutting said plate;
  (e) the two cells are connected in electrical series by at least two terminals of the cells; the electrical junction between these two terminals is effected substantially over said entire distance between extreme edges in the case of each extension which abuts at one of these terminals or which, at least in part, constitutes by its "free" end one of these terminals.

BRIEF DESCRIPTION OF THE DRAWINGS

The figures of the accompanying drawing, all of which are schematic, together with their description and the examples which follow are intended to illustrate the invention and to facilitate an understanding thereof, without, however, limiting its scope.

In the drawing.

DESCRIPTION OF THE PREFERRED EMBODIMENT

Figure 1:
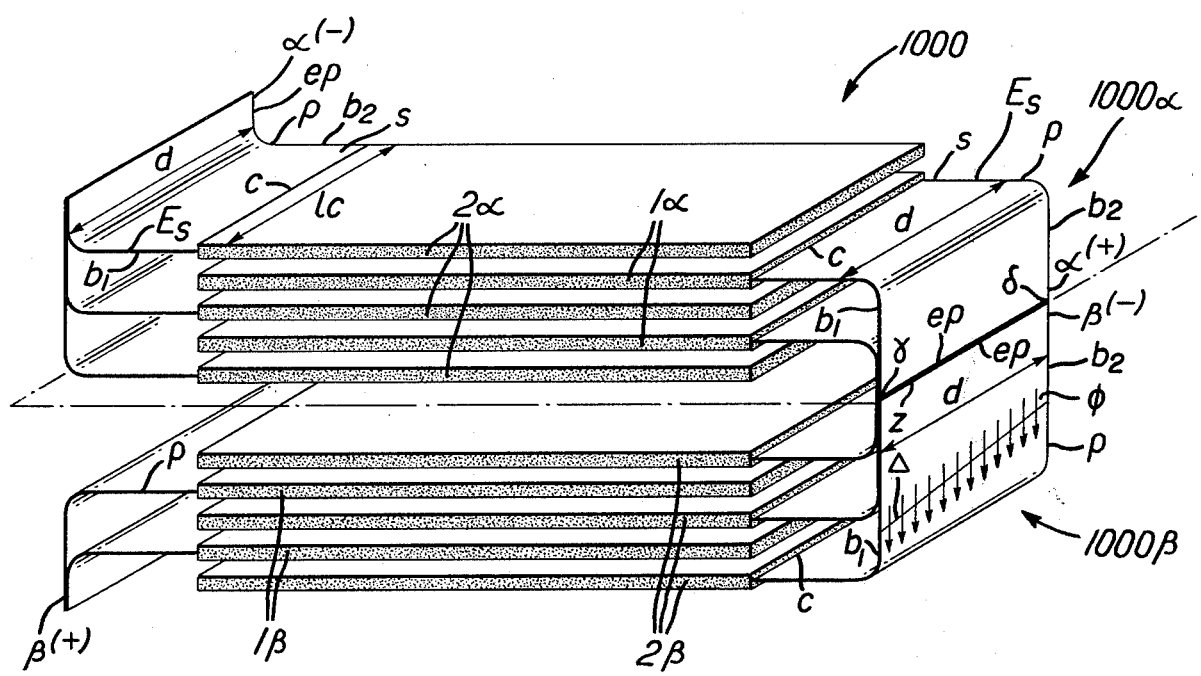
FIG. 1 shows a device in accordance with the invention, in perspective.

FIG. 1 shows a device according to the invention. This device 1000 has two cells 1000α, 1000β. The cell 1000α has two positive electrodes 1α and three negative electrodes 2α. The cell 1000β has two positive electrodes 1β and three negative electrodes 2β. These showings are not limitative since the devices in accordance with the invention may have more than two cells and each cell may have a variable number of positive and negative electrodes. The electrodes 1α, and 2α, 1β, 2β are in the form of plates, for instance substantially flat plates. Each plate is joined on one side "c" to a current outlet "s". The expression "current outlet" refers in the present text to an electron-conductive member which is electrically joined to one electrode, that is to say to one plate, in such a manner as to permit the draining of the inlets and outlets of electrical charges (that is to say of electrons) towards said electrode or coming from said electrode. Each current outlet "s" is in its turn joined to an electron-conductive extension "p".

For purposes of simplification, the parts of the device 1000 which are not essential for a description of the invention, for instance the electrolyte and the housing or housings of the cells, have not been shown in FIG. 1.

Each outlet "s" and its extension "p" may be structurally different or else form a single part, for instance a conductive sheet. In such latter case, the outlet "s" corresponds to the portion of the sheet which is in contact with the plate, the rest of the sheet corresponding to the extension "p". In the cell 1000α the extensions "p" corresponding to the positive plates 1α abut at the positive terminal $\alpha^{(+)}$ and the extensions "p" corresponding to the negative plates $2\alpha$ abut at the negative terminal $\alpha^{(-)}$. Similarly, in the cell $1000\beta$ the extensions "p" corresponding to the positive plates $1\beta$ abut at the positive terminal $\beta^{(+)}$ and the extensions "p" corresponding to the negative plates $2\beta$ abut at the negative terminal $\beta^{(-)}$.

The extension "p" corresponding to each plate therefore abuts at its end "ep" at one of the terminals $\alpha^{(+)}$, $\alpha^{(-)}$, $\beta^{(+)}$, $\beta^{(-)}$, the terminals $\alpha^{(+)}$, $\alpha^{(-)}$ being the terminals of the cell $1000\alpha$ and $\beta^{(+)}$, $\beta^{(-)}$ being the terminals of the cell $1000\beta$. Each extension "p" may also possibly constitute, at least in part, one such terminal at its end "ep". Each of these ends "ep" is called "free" since it is not connected to a current outlet "s".

The electrical junction between each plate and its outlet "s" is effected substantially over the entire corresponding side "c" of the plate.

Each outlet "s" and the corresponding extension "p" form an assembly $E_s$ which is located outside of the corresponding plate. The distance "d" between the extreme edges $b_1$, $b_2$ of this assembly $E_s$ is practically equal to the length "$l_c$" of the corresponding side "c" of this plate, from this plate up to the free end "ep" of the corresponding extension "p", these extreme edges abutting at said plate, and said free end "ep" abutting at a terminal or at least in part constituting a terminal.

When the side "c" of the plate is not linear, the distance "$l_c$" is measured between the end points of said side.

The electrical junction between each outlet "s" and its extension "p" is effected substantially over the entire corresponding distance "d".

The cells $1000\alpha$, $1000\beta$ are connected in electrical series by the terminals $\alpha^{(+)}$ and $\beta^{(-)}$. The electrical connection between these two terminals is effected substantially over the entire distance "d" between the extreme edges $b_1$, $b_2$ of each extension which abuts at one of these terminals or which, at least in part, constitutes at its "free" end one of these terminals. FIG. 1 indicates by way of example, in black, an electrical contact zone Z relative to the electrical junction between an extension "p" corresponding to the terminal $\alpha^{(+)}$ and an extension "p" corresponding to the terminal $\beta^{(-)}$. This zone Z also corresponds to the electrical junction between two successive extensions "p" to the terminal $\alpha^{(+)}$, on the one hand, and to the terminal $\beta^{(-)}$, on the other hand. This zone Z has been shown in the form of a continuous band which extends between its ends $\gamma$, $\delta$ over the entire distance "d" between the extreme edges $b_1$, $b_2$ of each corresponding extension "p", this band being, for instance, parallel to the sides "c" to which it is joined. This is in no way limitative. One can, in fact, contemplate junction zones Z of any shape, for instance zones which are substantially linear but not parallel to the sides "c", or zones in the form of broken lines or curved lines. This zone may also be formed of several elementary electric junction zones, consisting, for instance, of spot welds or nut and bolt assemblies.

This is true also, for instance, when the extensions "p" are formed of blades which are substantially parallel to and separated from each other. Such blades will be described subsequently in detail in the present specification. It goes without saying that the extensions "p" may possibly be continuous from the terminal $\alpha^{(+)}$ to the terminal $\beta^{(-)}$ or between two plates of the same cell. In all the embodiments mentioned above, the electrical junction along the zone Z is effected over the entire distance "d" between the extreme edges $b_1$, $b_2$ corresponding to the terminals $\alpha^{(+)}$, $\beta^{(-)}$.

The advantages provided by the device 1000 of the invention are as follows:

The assembly $E_s$ formed by each extension "p" and the corresponding outlet "s" makes it possible, due to the nature of the electrical junctions described above, to obtain a sheet of current such that the electrical current density is practically uniform along any straight line on this unit. One such straight line $\Delta$ is shown in FIG. 1, the homogeneity of distribution of the current density along this line $\Delta$ being schematically indicated by the group $\Phi$ of parallel arrows of the same length. This uniform current density assures homogeneous operation of all the electrodes of the same cell in a direction perpendicular to the direction of flow of the charges, whatever the cell considered. This property assists in particular in improving the energy per unit of mass and the efficiency when the device is an electric current generator. This homogeneity in the distribution of the current density is present even if the length of the electrical connections is short, that is to say even if the distance separating each terminal from the corresponding plates is short as compared with the length "$l_c$" of the corresponding sides, the ratio of this distance (measured along the corresponding assembly $E_s$) to the length "$l_c$" being able thus to be as low as the general arrangement of the device 1000 requires.

The description given above of the zone or zones of electrical junction to the terminals $\alpha^{(+)}$, $\beta^{(-)}$ can be applied to the other terminals $\alpha^{(-)}$, $\beta^{(+)}$.

Figure 2:
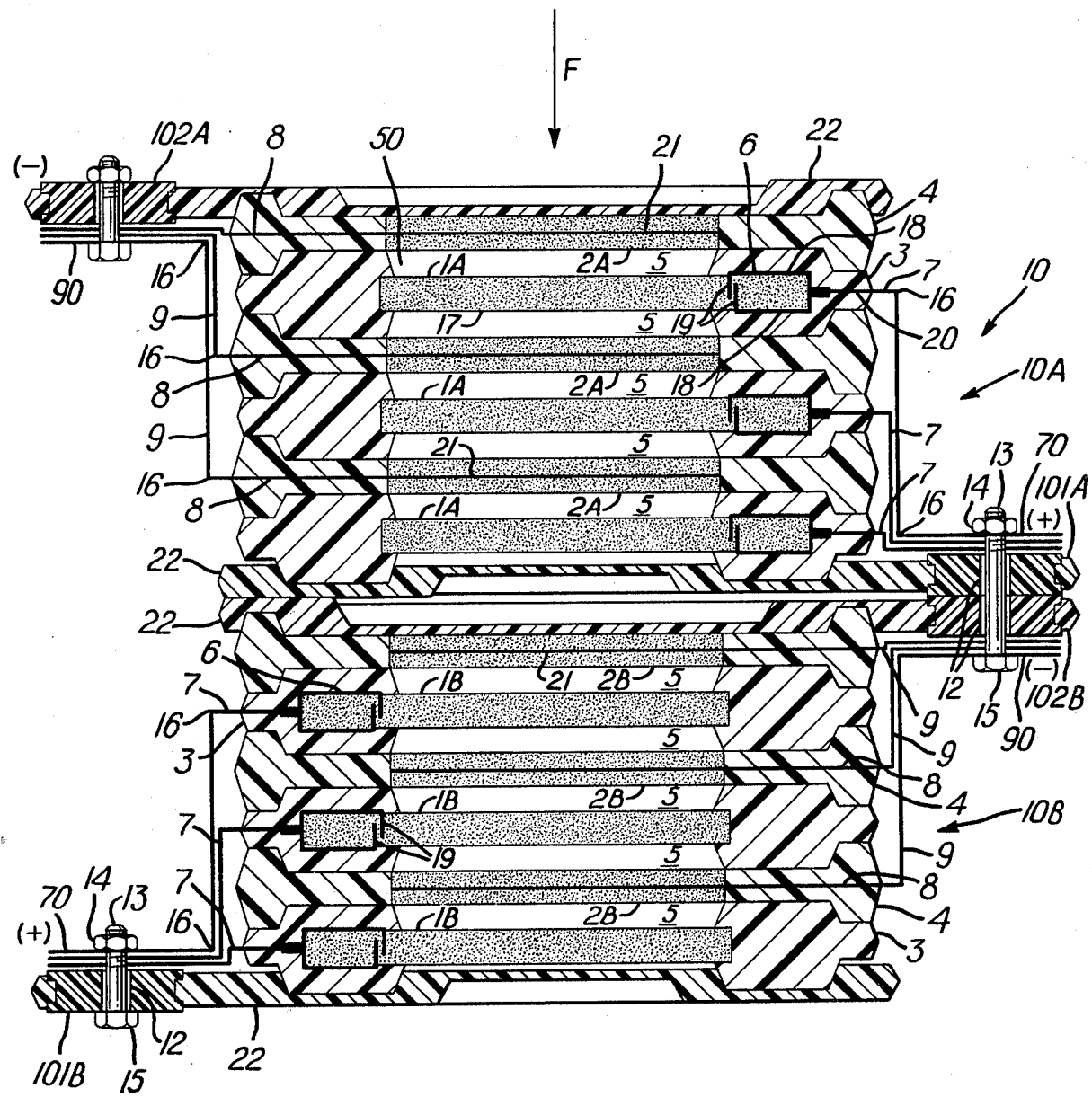
FIG. 2 shows another device according to the invention, in horizontal section.

FIG. 2 shows another device according to the invention, this device 10 being, for instance, a battery which produces electric current. The device 10 comprises two cells 10A and 10B. The cell 10A comprises three positive electrodes 1A and three negative electrodes 2A. In similar manner, the cell 10B has three positive electrodes 1B and three negative electrodes 2B. These electrodes have the shape of vertically arranged plates. Each positive electrode 1A, 1B is surrounded by an insulating frame 3 and each negative electrode 2A, 2B is surrounded by an insulating frame 4. In each cell, the plates are arranged one opposite the other so that two successive electrodes have opposite signs. Two successive electrodes, for each cell, and their corresponding frames define a liquid-tight chamber 5 containing an electrolyte 50. Each positive electrode 1A, 1B is connected on one side to a current outlet 6 mounted in the frame 3 and having an extension 7 which is located outside the frame 3 and insulated from the electrolyte 50.

In similar fashion, each negative electrode 2A, 2B is connected on one side to a current outlet 8 mounted in the frame 4 and having an extension 9 located outside the frame 4 and insulated from the electrolyte 50. The extensions 7 and 9 are, for instance, made of copper sheets.

Figure 3:
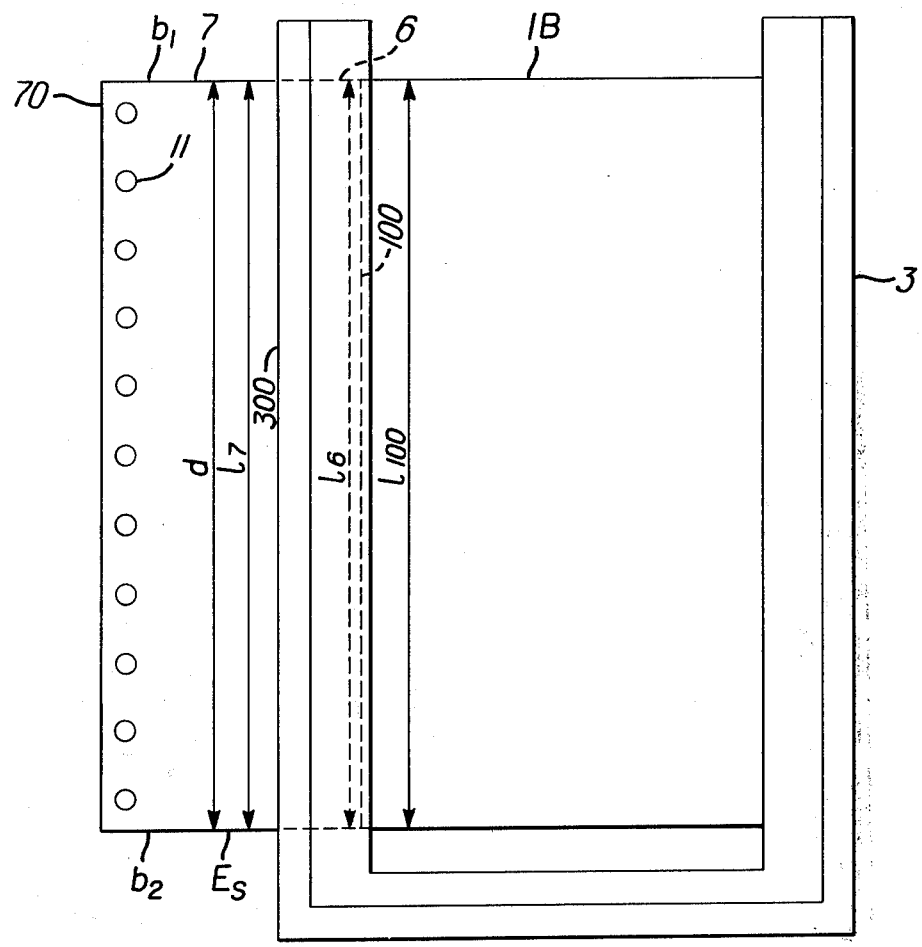
FIG. 3 shows an electrode used in the device of FIG. 2, in plan view.

FIG. 3 shows, before mounting in the device 10, a positive electrode 1B having the shape of a rectangular plate. This plate is surrounded by a frame 3. The outlet 6 and the extension 7 corresponding to this plate are each in the form of a rectangular sheet. The length $l_6$ of the outlet 6, measured along the vertical adjacent side 100 of the plate 1B, and the length $l_7$ of the extension 7, measured along the vertical adjacent side 300 of the frame 3 (that is to say along the outlet 6), have practically the same value as the length $l_{100}$ of the side 100 of the plate 1B, $l_{100}$ being therefore the height of the electrode. The electrodes 2B, 1A, 2A have, for instance, a similar arrangement. Each extension 7 corresponding to a positive electrode 1B has a "free" end 70 not connected to the frame 3. This end has holes 11 over its entire length, that is to say over the entire length $l_7$. FIG. 3 shows, for instance, eleven holes 11 for the end 70. The three ends 70 of the cell 10B are electrically connected to a conductive elongated member 101B having holes 12. This member 101B serves as positive terminal for the cell 10B and is made, for instance, of metal. The holes 11, 12 correspond to each other so that the three ends 70 are electrically joined to each other and to the member 101B by eleven bolts 13 placed in the holes 11, 12, the nuts 14 and the bolt heads 15 permitting good clamping of the ends 70 and of the member 101B and therefore good electrical contact. The ends 70 are arranged on one and same side of the member 101B, the electrical junction between these ends and the member 101B being effected practically over the entire length $l_7$ of these ends. The connecting of the ends 70 can be effected by producing one or more bends 16 in the sheets 7, as shown in FIG. 2.

It goes without saying that the bolts 13, together with the nuts 14 and the heads 15, can possibly be replaced by welds and that one can dispense with the use of the member 101B, the positive terminal in such case being formed by the connection itself of the ends 70, so as, for instance, to limit the weight of the device 10.

The negative terminal 102A of the cell 10A is connected electrically to the ends 90 of the extensions 9 of this cell in a manner similar to that which was described for the terminal 101B. The same is true of the terminal 101A, which is connected to the ends 70 of the extensions 7 of the cell 10A and of the terminal 102B which is connected to the ends 90 of the cell 10B, with the difference that in this case the bolts 13 pass both through the members 101A, 102B and the ends 70, 90 so as to cause a clamping of the assembly of these members and of these ends by the nuts 14 and the heads 15, the members 101A, 102B being in direct contact with each other. The electrical junction between the terminals 101A, 102B is effected therefore substantially over the entire length of the ends 70, 90 which abut at these terminals, this length having the same value $l_7$. Here again the bolts 13 together with the heads 15 and the nuts 14 can be replaced by welds, and the terminals 101A, 102B can be formed by the connecting of the ends 70 and/or 90.

The terminals 101B, 102A are therefore the terminals of the device 10 whose cells 10A, 10B are connected electrically in series. For an observer viewing the device 10 in the direction indicated by the arrow F perpendicular to the electrodes (FIG. 2), the terminals 101B, 102A are arranged on one side and the electrically connected terminals 101A, 102B are arranged on the opposite side, the successive outlets 6, 8 and the successive extensions 7, 9 being therefore arranged alternately in one direction or the other.

For purposes of simplicity, the device 10 has only two cells, each having only three positive electrodes and three negative electrodes, but it goes without saying that the invention applies whatever the number of cells or of electrodes.

By way of example, the device 10 is an alkaline battery of the nickel/iron type. The electrodes 1A, 1B are positive nickel electrodes and the electrodes 2A, 2B are negative iron electrodes. Each positive electrode 1A, 1B has a carbon felt 17 and the outlet 6 corresponding to this electrode has two bent nickel plates 18, with roughnesses 19 which penetrate into the felt 17, the plates 18 being in electrical contact with each other, for instance as the result of a weld. The plates 18 are made integral with the felt 17 due to an electrolytic deposit (not shown) adhering both to the felt 17 and to the plates 18. This deposit consists, for instance, of nickel, the felt 17 having been also covered with nickel by electrolysis upon assembly between the plates 18 and the felt 17. Prior to the mounting in the battery 10, the active material (not shown) has been deposited in the nickel-plated felt 17. Such an electrode is described in applicant's French Patent Application No. 79 18549 (which corresponds to U.S. Applications Ser. Nos. 166,027, filed July 7, 1980, and 339,485, filed Jan. 15, 1982). The plates 18 have a conductive free end 20 formed, for instance, of one side of a bend of one of the plates 18, the extension 7 being formed by the portion of said end 20 which is outside the frame 3, the outlet 6 and the extension 7 therefore forming a common sheet $E_s$, the distance "d", which is, for instance, constant, between the extreme edges $b_1$, $b_2$ of this sheet being practically equal to $l_{100}$ (FIG. 3).

Each iron negative electrode 2A, 2B has, in known manner, a current collector 21, for instance of copper, surrounded by an active material comprising iron and/or an iron oxide. The extension 9 is formed, for instance, by the portion of the collector 21 which is outside the frame 4, the outlet 8 being formed by the portion of the collector 21 which is within the frame 4.

The electrolyte 50 arranged within the chambers 5 is an aqueous potassium hydroxide solution.

The frames 3, 4 are made, for instance, by molding a plastic over the periphery of the electrodes so as to insulate the outlets 6, 8. This material may be thermoplastic or thermosetting. Each member 101A, 102A, 101B, 102B is extended by an insulating plate 22, referred to as the end plate, made, for instance, in the same way as the frames 3, 4 with a plastic material. The assembly of the electrodes of each cell 10A, 10B is thus fastened between two plates 22 so as to form a rigid, liquid-tight assembly due to a welding of the frames 3, 4 to each other or to the plates 22, the electrodes being arranged, for instance, vertically.

It goes without saying that the battery 10 may possibly, in known manner, be provided with separators or spacers between the electrodes.

In addition to the homogeneous operation of the electrodes which has already been described, the battery 10 has the following advantages:

(1) the upper and lower portions of the battery are without current outlets and terminals, since the latter are arranged on the sides; access to the upper part of the device is therefore free and easy, which makes it possible, in particular, easily to introduce the electrolyte into the cells;

(2) the frames 3 and 4 which are in contact make it possible to insulate the extensions 7, 9 from the electrolyte and to regulate as desired the thickness of the layer of electrolyte in the chambers 5 since it is sufficient to regulate the thickness of the frames accordingly;

(3) the cells are easily interchangeable in the device; it is therefore easy to replace one of them or to modify the number thereof in order, for example, to vary the voltage at the terminals of the device.

In short, the device 10 is characterized by easy assembly or disassembly, by a low loss of power as a result of Joule effect, and by total chemical insulation of the electrical connections between electrodes, or between cells, with respect to the electrolyte.

Figure 4:
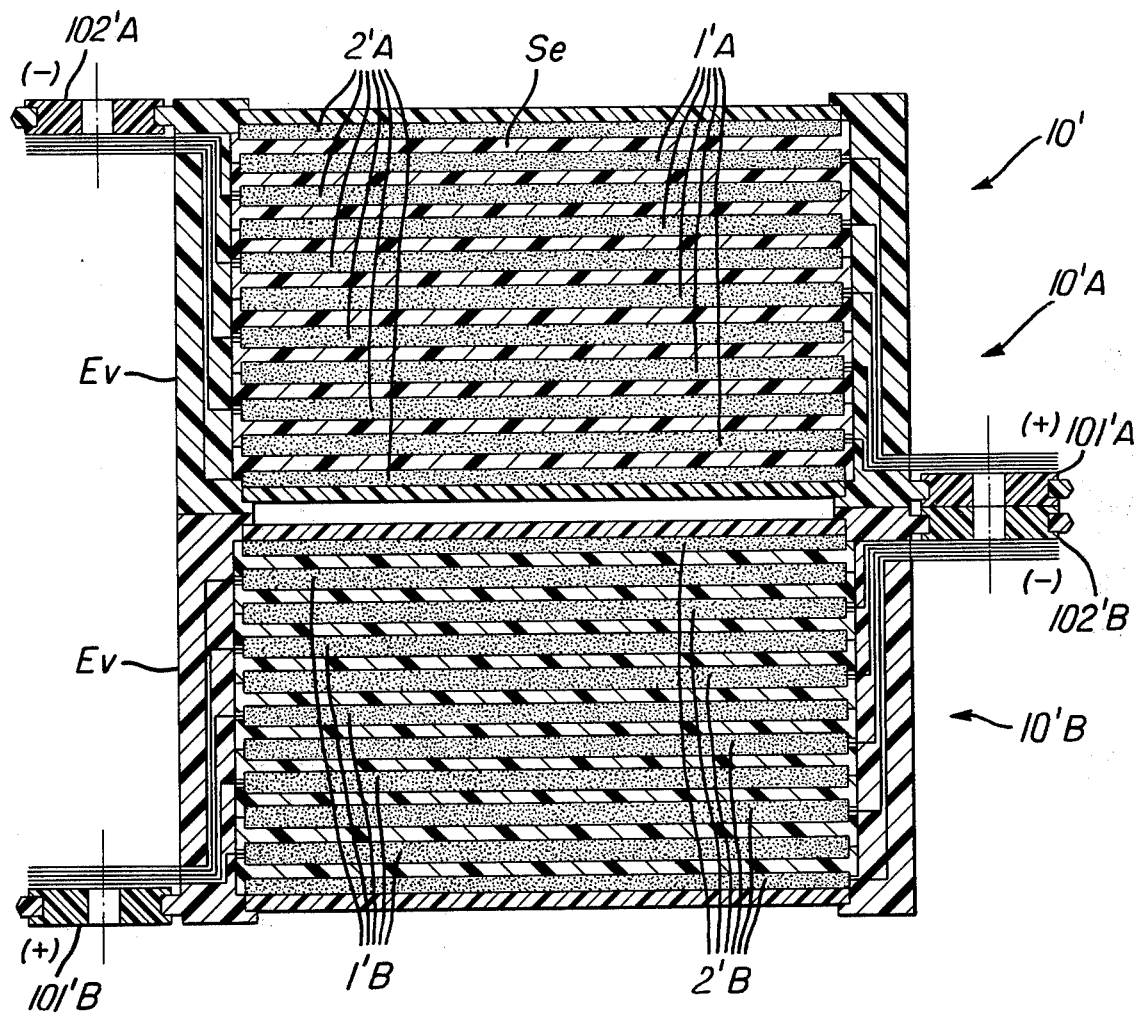
FIG. 4 shows another device according to the invention, in horizontal section.

FIG. 4 shows another device in accordance with the invention. This device 10' has two cells 10'A, 10'B. The cell 10'A has five positive electrodes 1'A and six negative electrodes 2'A. In similar manner, the cell 10'B has five positive electrodes 1'B and six negative electrodes 2'B. In each cell, two successive electrodes have opposite signs and are separated by a separator $S_e$. The cell 10'A has the positive terminal 101'A and the negative terminal 102'A.

The cell 10'B comprises the positive terminal 101'B and the negative terminal 102'B. The cells 10'A, 10'B are connected in electrical series by terminals 101'A, 102'B, the terminals 101'B and 102'A being the terminals of the generator 10'. The general arrangement of the device 10' is similar to that of the device 10 which was previously described, except that in the device 10' the electrodes are not surrounded in insulating fashion by an individual frame. Each cell 10'A, 10'B rather has an envelope $E_v$ which is molded directly over the entire contours of the electrodes 1'A, 2'A or 1'B, 2'B and separators $S_e$, the molded material being, for instance, possibly a thermoplastic or thermosetting material. This over-molding technique may have the advantage of simplifying the production of devices according to the invention while assuring a good seal.

Figure 5:
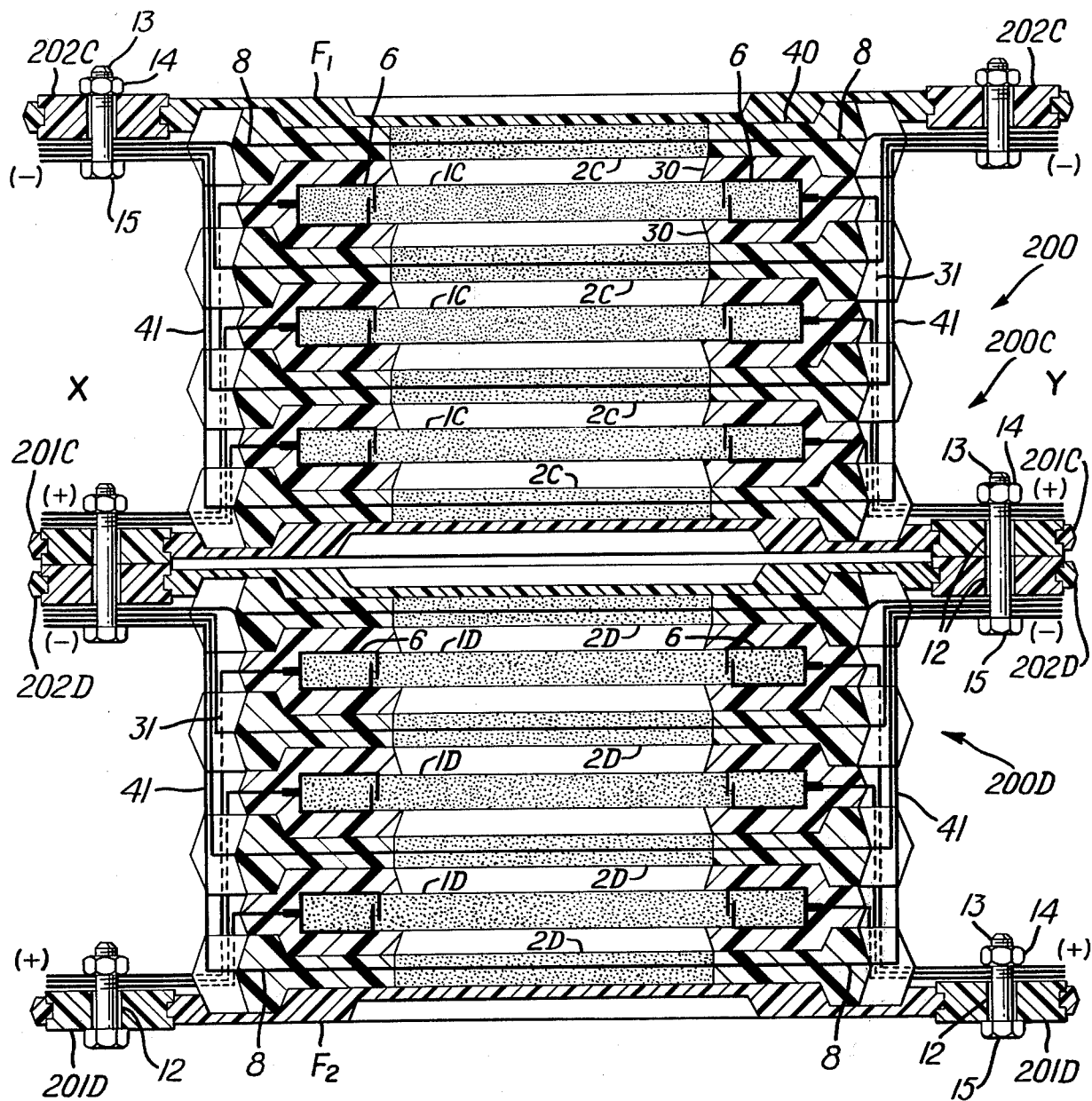
FIG. 5 shows another device according to the invention, in horizontal section.

FIG. 5 shows another device 200 according to the invention. This device has two cells 200C, 200D. The cell 200C has three positive electrodes 1C and four negative electrodes 2C. Similarly, the cell 200D has three positive electrodes 1D and four negative electrodes 2D.

This device 200 differs from the device 10 by the fact that each positive electrode 1C, 1D is joined to two current outlets 6, arranged on two opposite sides, and by the fact that each negative electrode 2C, 2D is joined to two current outlets 8, also arranged on two opposite sides. The outlets 6 and 8 are, for instance, identical to the outlets 6 and 8, respectively, which were previously described and shown in FIG. 2, the electrodes 1C, 1D and the electrodes 2C, 2D being positive and negative electrodes, respectively, similar to the electrodes previously described in the case of the device 10.

Figure 6:
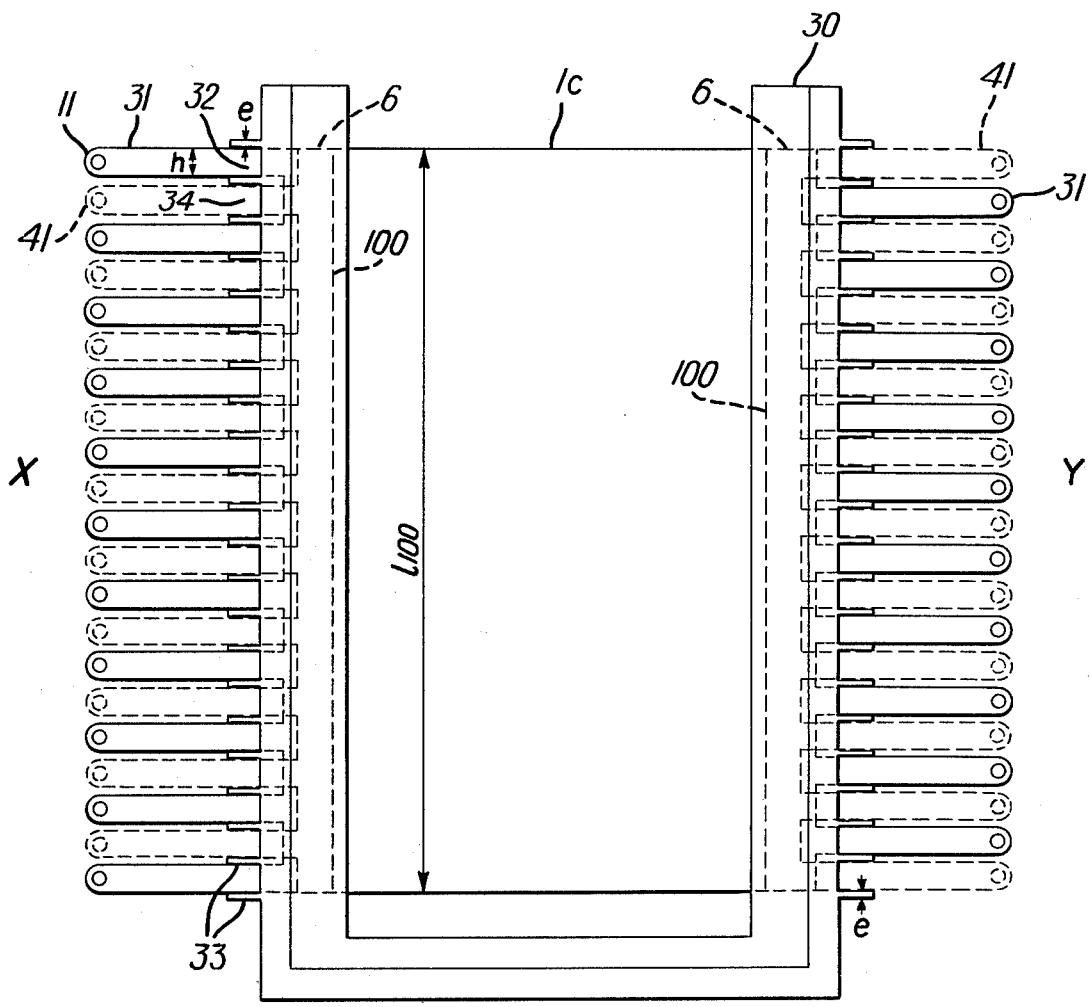
FIG. 6 shows an electrode used in the device of FIG. 5, in plan view.

FIG. 6 shows, by way of example, an electrode 1C before mounting in the device 200. The outlets 6 relative to this electrode are extended to the outside of the frame 30 surrounding this electrode by conductive blades 31 arranged on each side of the frame 30, the top and the base of frame 30 being without blades. These blades 31 are obtained, for instance, by stamping from a rectangular metal plate which forms an extension of each outlet 6. Each blade 31 is arranged in a notch 32 of the frame 30, each notch being defined by two protuberances 33 of the frame 30. Two successive blades 31 are separated by an empty notch 34 which, in turn, is defined by two protuberances 33 of the frame 30. The blades 31 are cut out from the portions of the outlets 6 which are not adjacent to the electrode 1C.

By way of example, the vertical positive electrode 1C, shown in FIG. 6, is extended by eleven blades 31 on one side of the device 200, this side being represented by the letter X and by ten blades 31 on the opposite side of the device 200, this opposite side being represented by the letter Y. Before assembly these blades have their largest dimension, oriented horizontally, their width having a vertical direction. Each of these blades has a hole 11 at its "free" end (not provided with reference number) furthest from the frame 30 (FIG. 6). The blades 31 of the electrodes 1D have a similar arrangement.

Each vertical negative electrode 2C, 2D is extended, on the other hand, by ten blades on side X and eleven blades on side Y. FIG. 6 shows, in dashed lines, the blades 41 corresponding to an electrode 2C adjacent to the electrode 1C shown in this figure.

For each electrode, the assembly of blades 31 or 41 arranged on a side X or Y therefore constitutes an extension of the outlet 6 or 8 to which they correspond, this assembly of blades and this outlet being obtained from a common conductive sheet. Each blade 41 is arranged in a notch of the frame 40 surrounding this electrode 2C, each of these notches being limited by two protuberances. These notches and protuberances have not been shown in FIG. 6 in order to simplify the drawing.

The blades 41 are located at intermediate levels with respect to the blades 31, that is to say these blades 41 are arranged in notches whose level corresponds to the empty notches 34.

The assembling is effected in the following manner: In each cell 200C, 200D, the blades 31 of the electrodes 1C or 1D corresponding to the same side X or Y are connected electrically to each other and to a positive conductive terminal 201C or 201D provided with holes 12. The assembling is effected by bending over at least a portion of the blades and connecting the blades 31 of the same level by bolts 13 to each other and to the corresponding positive terminal 201C or 201D due to the correspondence of the holes 11, 12, the clamping being effected by nuts 14 and the bold heads 15 in a manner similar to that which has been described previously in the case of the device 10. The assembling between the blades 41 of the electrodes 2C or 2D corresponding to each cell 200C, 200D is effected in similar manner, with the negative terminals 202C, 202D on the opposite sides X, Y.

The cell 200C therefore has a positive terminal 201C and a negative terminal 202C on each side X or Y, and the cell 200D has a positive terminal 201D and a negative terminal 202D on each side X or Y. The fact that the blades 31, on the one hand, and 41, on the other hand, are alternate permits this arrangement by crisscrossing of blades 31, 41 and by passage of these blades into the empty notches corresponding to the electrodes of opposite sign. The protuberances described above make it possible both to increase the rigidity of the frames 30, 40 and to have an easy crossing of the blades 31, on the one hand, and 41, on the other hand, avoiding any electrical contact at the places where the blades of opposite polarities cross.

The vertical thickness of these protuberances is selected in such a manner as to obtain a vertical width, that is to say a height of the blades 31, 41 which is sufficient to guarantee the homogeneity of operation of the electrodes.

By way of example, the dimensional characteristics of the electrode 1C, of the blades 31 and of the protuberances 33 (FIG. 6) are as follows:
 height $l_{100}$ of the electrode: 210 mm;
 height "h" of each blade: 8 mm;
 vertical thickness "e" of each protuberance: 2 mm.

In FIG. 6, the height of the assembly of blades 31 is either equal to $l_{100}$ on side X or slightly less than $l_{100}$ on side Y, the difference then corresponding substantially to h+e for the upper portion and h+e for the lower portion, the blades 31, on the one hand, and 41, on the other hand, being distributed substantially over the entire height $l_{100}$ in uniform manner.

The cell 200C therefore has a total of four terminals. In similar manner, the cell 200D has a total of four terminals. The terminals 201C and 202D of opposite signs are located in the central portion of the device 200, the terminals 202C, on the one hand, and 201D, on the other hand, are located on two opposite end faces $F_1$, $F_2$ of the device 200, these faces having an orientation practically parallel to that of the plates 1C, 1D, 2C, 2D. Each terminal 201C of the cell 200C is connected to the neighboring terminal 202D of the cell 200D in a manner similar to that which was described previously in the case of the terminals 101A, 102B of the device 10. The cells 200C, 200D are thus connected electrically in series on each side X, Y of the device 200, the terminals 202C and 201D being the negative and positive terminals respectively of this device.

It goes without saying that the terminals 202C may possibly be connected to a common negative terminal if so desired and that likewise the terminals 201D may be possibly connected to a common positive terminal, these terminals not being shown in the drawing for purposes of simplification.

The fact that in device 200 use is made of current outlets arranged on opposite sides of each electrode further improves the homogeneity of operation of this electrode in a direction perpendicular to the flow of the charges. This advantage is obtained practically without increase in the ohmic drop in these connections.

The distribution of the blades 31, 41 over the height of each side of the electrodes guarantees the homogeneity of operation in height, that is to say the drainage of the electrical charges takes place practically homogeneously over this entire side, as in the devices previously described.

It should be noted that the blades 31, 41 may possibly have lengths which vary for the same plate, the variations in length of the blades being possibly complementary for two electrically connected plates corresponding to two adjacent cells.

The outlets 6, 8 could possibly have blades 31, 41 but it is preferable, however, to have continuous outlets, as previously described.

The number of blades 31, 41 which was mentioned above is in no way limitative, the essential thing being that this number be sufficient to assure such a homogeneous operation on the sides.

Each of the cells 200C, 200D can be provided with an envelope molded over it in accordance with what has been described previously in the case of the generator 10′. In this case, it may be useful to effect the overmolding on the blades 31 and 41 in such a manner that the molded material surrounds the places where the blades 31, 41 cross, which facilitates the electrical insulation at the points of crossing between the blades of opposite polarities.

Figure 7:
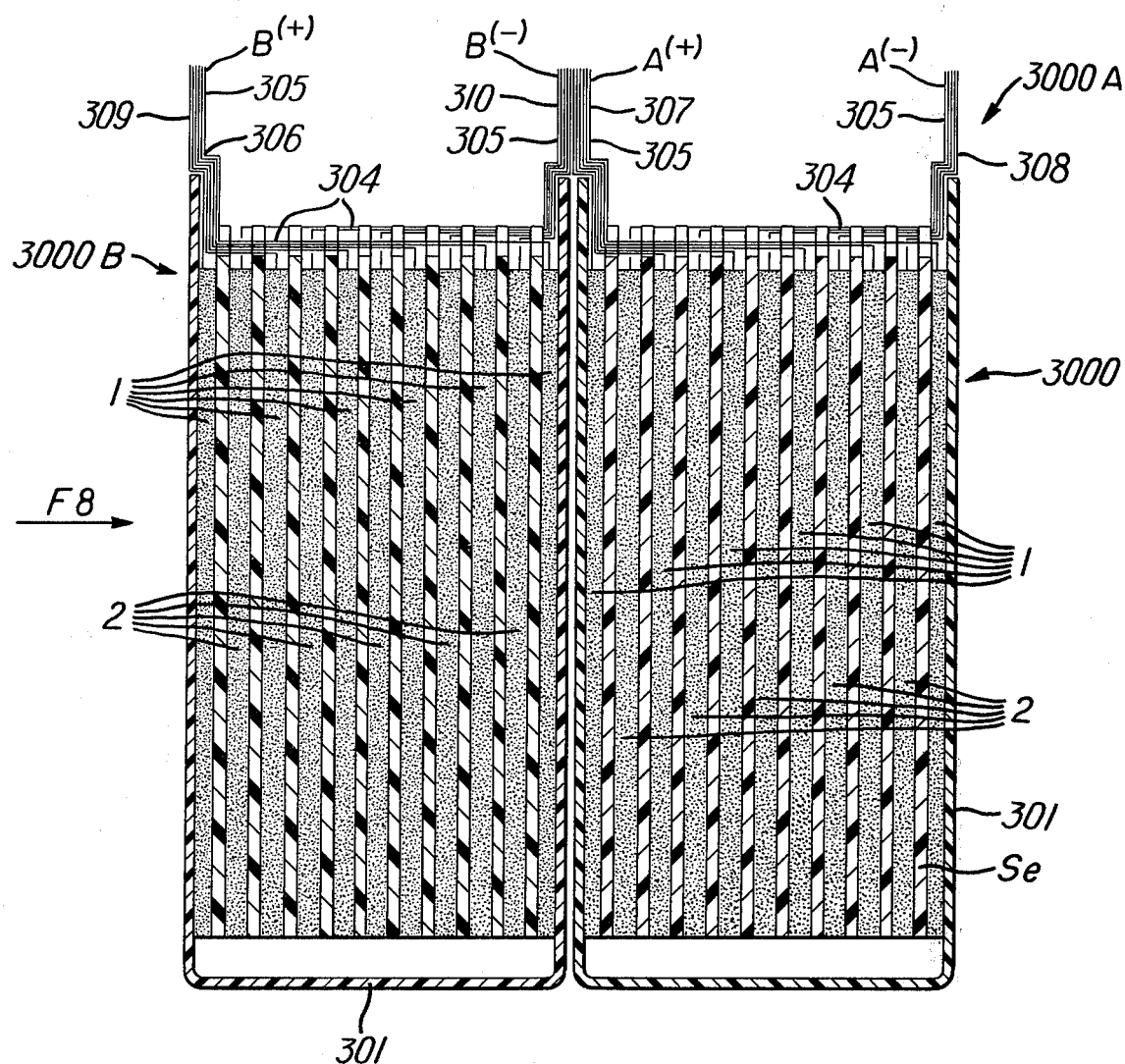
FIG. 7 shows another device according to the invention, in vertical section.
Figure 8:
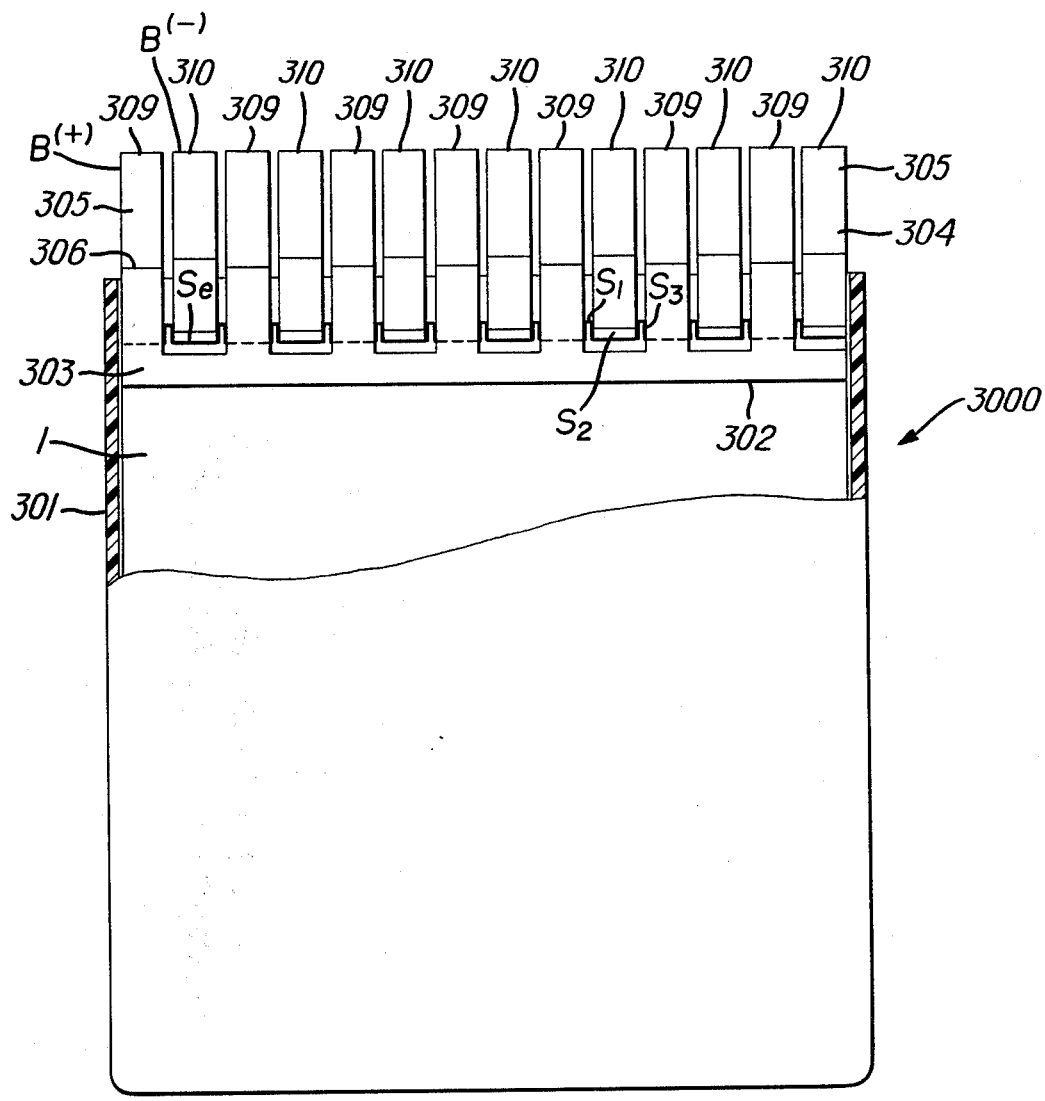
FIG. 8 shows the device of FIG. 7 in an exploded view, this view being seen in the direction of the arrow F8 in FIG. 7.
Figure 9:
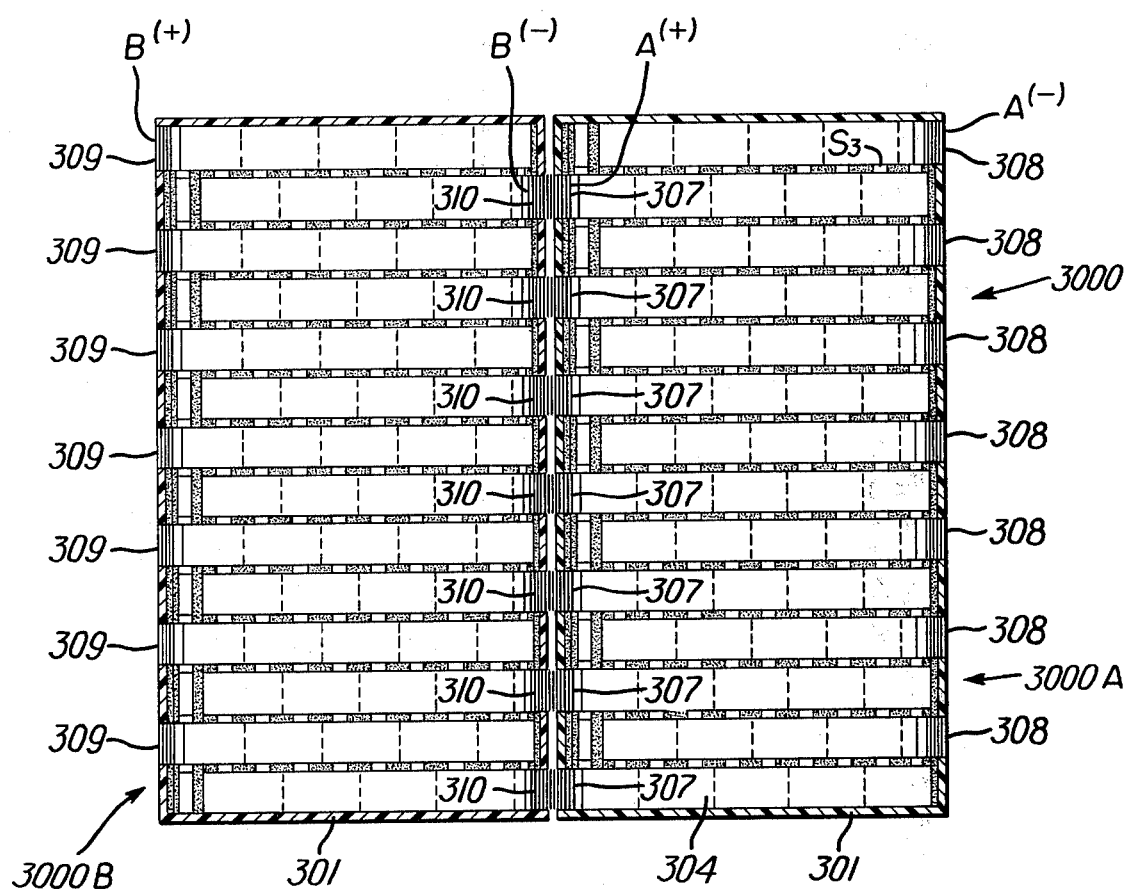
FIG. 9 shows the device of FIGS. 7 and 8, in top view.

FIGS. 7, 8, 9 show another device in accordance with the invention. This device 3000 has two cells 3000A, 3000B. Each cell has a tank 301 containing an electrolyte, not provided with reference number in the drawing.

In each tank 301 there are contained six positive electrodes 1 and five negative electrodes 2 in the form of plates, two successive electrodes having opposite signs and being separated by a separator $S_e$ (FIG. 7). Each plate 1, 2 is joined, on its upper side 302, to a current outlet 303, the length of each outlet 303 being substantially the same as that of the corresponding side 302 (FIG. 8). These lengths have not been marked in order not to clutter the drawing. Each outlet 303 is extended by seven blades 304. In each cell 3000A, 3000B these blades are bent and folded over horizontally. These blades 304 cross each other in a manner similar to what has been described previously in the case of the device 200. The electrical insulation at the places where the blades of opposite signs cross can be obtained, for instance, by using separators $S_e$ whose upper side $S_1$ is located at a higher level than the upper side 302 of the electrodes, this side $S_1$ of the separator having notches $S_2$ for the passage of the blades 304 in such a manner that each blade is arranged in notches $S_2$ and that two blades of opposite signs which cross are separated by a protuberance $S_3$ of the separator $S_e$, this protuberance $S_3$ separating two notches $S_2$ (FIGS. 8, 9). In each cell, the blades 304 of the same polarity are superimposed above the plates (FIGS. 7, 9). It goes without saying that other means of insulation are possible, for instance the use of insulating varnishes. These means can be combined with the protuberances $S_3$. Each blade 304 has a vertical end 305 defined, for instance, by a bend 306 of said blade (FIGS. 7, 8).

The cell 3000A thus comprises an assembly $A^{(+)}$ of seven groups 307 with positive ends 305 and an assembly $A^{(-)}$ of seven groups 308 with negative ends 305, each group 307 having six ends 305 and each group 308 having five ends 305. In similar manner, the cell 3000B has an assembly $B^{(+)}$ of seven groups 309 with positive ends 305 and one assembly $B^{(-)}$ of seven groups 310 with negative ends 305, each group 309 having six ends 305 and each group 310 having five ends 305. The expressions "positive ends" and "negative ends" means that the ends 305 correspond either to positive plates or to negative plates.

In each group 307 to 310 the ends 305 can be joined electrically to each other in known manner, for instance by soldering them.

The cells 3000A, 3000B are joined electrically in series by the assemblies $A^{(+)}$, $B^{(-)}$, which connection can be produced, for instance, by soldering each group 307 to a group 310, and these assemblies $A^{(+)}$, $B^{(-)}$ can be juxtaposed. The assemblies $A^{(-)}$, $B^{(+)}$ located at opposite ends of the device 3000 constitute, at least in part, the terminals of the device 3000.

In accordance with the invention, each electrical connection of the device 3000 is delocalized and distributed over the entire length of the side 302 of the corresponding electrode, whatever the electrode and whatever the cell in which it is present, even if the electrical series of the device 3000 comprises more than two cells. The density of the current along any entire side 302 is practically uniform, with the advantages which have already been described resulting therefrom.

The devices 10, 200 have been previously described as alkaline batteries of Ni/Fe type. It goes without saying that this example is in no way limitative. For instance, one may contemplate other types of primary or secondary electric current generators in which the positive or negative active material may be a metal, for instance lead, zinc, cadmium, silver, manganese, aluminum, magnesium, cobalt, or an alkaline or alkaline-earth metal. This active material may also, for instance, be an oxide or a hydroxide of these metals or of other metals, a salt, for instance a halide or a chalcogenide of a transition metal, or a mixture of these materials. The electrolyte is not necessarily alkaline; it may be neutral or acid. One may even employ non-aqueous electrolytes, for instance electrolytes employing organic solvents, or even solid electrolytes.

The invention applies also to fuel cells, the negative active material being then, for instance, hydrogen or a hydrogen compound. The invention applies also to electrolytic devices which consume electric current.

What is claimed is:

1. An electrochemical device comprising at least two cells, each cell comprising at least one positive electrode and at least one negative electrode in the form of plates, characterized by the following features:
   (a) each plate is joined on at least one side to a current outlet which in turn is joined to an electron-conductive extension which is formed of blades or has blades, said blades being distributed substantially over the entire distance between the extreme edges of the corresponding assembly;
   (b) the extension corresponding to each plate abuts at its so-called "free" end at a terminal, called the "cell terminal", of the same polarity as the plate, or, at least in part, constitutes such a terminal at its "free" end, each cell thus having at least one positive terminal and at least one negative terminal, at least one side of the device having terminals of opposite signs by crisscrossing of blades of opposite signs, the device having means for avoiding electrical contact at the places where the blades cross one another;
   (c) the electrical junction between each plate and its outlet is effected substantially over the entire corresponding side of the plate;
   (d) each outlet and the corresponding extension form an assembly located outside of the plate; the distance between the extreme edges of this assembly is substantially equal to the length of the corresponding side of said plate, from said plate up to the "free" end of the corresponding extension, these extreme edges abutting at said plate;
   (e) the two cells are connected in electrical series by at least two terminals of the cells; the electrical junction between these two terminals is effected substantially over said entire distance between extreme edges in the case of each extension which abuts at one of these terminals or which, at least in part, constitutes by its "free" end one of these terminals.

2. An electrochemical device according to claim 1, characterized by the fact that the electrical junction between each outlet and its extension is effected substantially over the entire distance between the extreme edges of the assembly which they form.

3. An electrochemical device according to claim 1 or 2, characterized by the fact that at least one outlet forms a continuous sheet.

4. An electrochemical device according to claim 3, characterized by the fact that the outlet is of rectangular shape.

5. An electrochemical device according to claim 1, characterized by the fact that at least one plate is connected only on one side to a current outlet.

6. An electrochemical device according to claim 1, characterized by the fact that at least one plate is connected to two current outlets arranged on two opposite sides.

7. An electrochemical device according to claim 1, characterized by the fact that at least one plate is surrounded by an individual frame.

8. An electrochemical device according to claim 7, characterized by the fact that at least one extension is formed of blades or has blades, each blade being arranged in a notch in the corresponding frame.

9. An electrochemical device according to claim 1, characterized by the fact that at least one plate is surrounded by an individual frame and the means for avoiding electrical contact consist, at least in part, of protuberances on the frame.

10. An electrochemical device according to claim 1, characterized by the fact that at least one cell has an envelope molded directly over the entire contours of the plates.

11. An electrochemical device according to claim 1, characterized by the fact that at least one cell has an envelope molded directly over the entire contour of the plates and the means for avoiding electrical contact consist, at least in part, of said envelope.

12. An electrochemical device according to claim 1, characterized by the fact that each blade of at least one extension is arranged in a notch in at least one separator.

13. An electrochemical device according to claim 1, characterized by the fact that each blade of at least one extension is arranged in a notch in at least one separator and the means for avoiding electrical contact consist, at least in part, of protuberances of the separator.

14. An electrochemical device according to claim 1, characterized by the fact that at least one outlet and the corresponding extension form a single sheet.

15. An electrochemical device according to claim 1, characterized by the fact that at least one of the outlets is connected to a vertical side of a plate.

16. An electrochemical device according to claim 1, characterized by the fact that at least one outlet is connected to a horizontal side of a plate.

17. An electrochemical device according to claim 1, characterized by the fact that it is an electric current generator.

* * * * *